United States Patent [19]

Schneider et al.

[11] Patent Number: 5,554,353
[45] Date of Patent: Sep. 10, 1996

[54] PREPARATION OF HYDROXYLAMMONIUM SALTS

[75] Inventors: Heinz-Walter Schneider, Ludwigshafen; Axel Wilms, Weisenheim; Rüdiger Schmitz, Lambsheim; Robert Schulz, Lampertheim; Klaus Michelsen, Hamburg, all of Germany

[73] Assignee: BASF Aktiengesellschaft, Ludwigshafen, Germany

[21] Appl. No.: 384,321

[22] Filed: Feb. 1, 1995

[30] Foreign Application Priority Data

Feb. 4, 1994 [DE] Germany .......... 44 03 479.2

[51] Int. Cl.⁶ .................... C01B 21/20
[52] U.S. Cl. .................... 423/387; 423/388
[58] Field of Search .................... 423/387, 388

[56] References Cited

U.S. PATENT DOCUMENTS

| 4,404,176 | 9/1983 | Grosskinsky et al. | 423/388 |
| 4,477,424 | 10/1984 | Grosskinsky et al. | 423/388 |
| 5,155,081 | 10/1992 | Steigleiter et al. | 502/185 |

FOREIGN PATENT DOCUMENTS

| 956038 | 1/1957 | Germany. | |
| 1088037 | 10/1957 | Germany. | |
| 4022851 | 1/1992 | Germany. | |
| 1214584 | 2/1986 | U.S.S.R. | 423/388 |
| 886801 | 4/1960 | United Kingdom. | |

OTHER PUBLICATIONS

John H. Perry's *Chemical Engineers' Handbook*, Fourth Edition (1963), McGraw-Hill Book Co., pp. 19–42, 19–86, 19–87.

*Primary Examiner*—Wayne Langel
*Attorney, Agent, or Firm*—Keil & Weinkauf

[57] ABSTRACT

A process for the preparation of hydroxylammonium salts by catalytic reduction of nitrogen monoxide using hydrogen in the presence of a hydrogenation catalyst, comprises (a) in a first step, filtering the reaction mixture obtained after the reaction, giving a solution of essentially hydroxylammonium salt and a filter residue essentially comprising a mixture of hydrogenation catalyst and a solution of essentially hydroxylammonium salt, and (b) in a second step, subjecting the filter residue to a further separation process in order to concentrate the hydrogenation catalyst, giving a mixture having a higher concentration of hydrogenation catalyst than the filter residue and a mixture having a lower concentration of hydrogenation catalyst than the filter residue.

4 Claims, No Drawings

PREPARATION OF HYDROXYLAMMONIUM SALTS

The present invention relates to an improved process for the preparation of hydroxylammonium salts by catalytic reduction of nitrogen monoxide using hydrogen in the presence of a hydrogenation catalyst.

Processes for the preparation of hydroxylammonium salts are disclosed, for example, in German Patent 956 038 and DE-A 4022851. Besides the conversion and selectivity, another factor which is of considerable importance for assessment of the economic efficiency of a process is the space-time yield. However, the space-time yields of processes disclosed hitherto for the preparation of hydroxylammonium salts is unsatisfactory.

It is an object of the present invention to provide an improved process for the preparation of hydroxylammonium salts by catalytic reduction of nitrogen monoxide using hydrogen in the presence of a hydrogenation catalyst, which process gives an improved space-time yield, higher selectivity and less dinitrogen monoxide than known processes.

We have found that this object is achieved by an improved process for the preparation of hydroxylammonium salts by catalytic reduction of nitrogen monoxide using hydrogen in the presence of a hydrogenation catalyst, which comprises (a) in a first step, filtering the reaction mixture obtained after the reaction, giving a solution of essentially hydroxylammonium salt and a filter residue essentially comprising a mixture of hydrogenation catalyst and a solution of essentially hydroxylammonium salt, and (b) in a second step, subjecting the filter residue to sedimentation in order to concentrate the hydrogenation catalyst, giving a mixture having a higher concentration of hydrogenation catalyst than the filter residue and a mixture having a lower concentration of hydrogenation catalyst than the filter residue.

In general, known processes for the preparation of hydroxylammonium salts, which are disclosed, for example, in DE-A 956 038 and DE-A 4022851, react nitrogen monoxide with hydrogen in dilute aqueous acid in the presence of suspended supported platinum catalysts at elevated temperature and elevated pressure.

In general, hydroxylammonium salts are prepared using a hydrogen:nitrogen monoxide molar ratio of from 1.5:1 to 6:1, preferably from 3:1 to 5:1. According to observations hitherto, particularly good results are obtained if it is ensured that a hydrogen:nitrogen monoxide molar ratio of from 3.5:1 to 5:1 is maintained in the reaction zone.

The acids used are advantageously strong mineral acids, such as sulfuric acid, nitric acid or phosphoric acid, particularly preferably sulfuric acid. Acid salts, such as ammonium bisulfate, are generally also suitable. In general, from 4 to 6 normal aqueous acids are used, and the acid concentration is usually not allowed to drop below 0.2 normal during the reaction.

The hydrogenation of nitrogen monoxide is generally carried out at from 30° to 80° C., preferably from 35° to 60° C. Furthermore, the pressure during the hydrogenation is usually selected to be in the range from 1 to 30 bar, preferably from 1.5 to 20 bar (absolute).

The mineral acid:catalyst ratio generally depends on the catalyst used. Preference is given to platinum-containing catalysts, usually partially poisoned with sulfur, selenium, arsenic or tellurium. Furthermore, these catalysts are generally applied to a support (see German Patent 956 038 and DE-A 4022851).

Preferred catalysts are platinum in combination with a carbon support material. The mineral acid:catalyst ratio is preferably chosen here to be in the range from 10 to 100 g, preferably from 30 to 80 g, of platinum/carbon catalyst per liter of mineral acid. The molar ratio between carbon, preferably graphite or activated charcoal, and platinum is generally selected to be in the range from 99.99 to 10 mol%, preferably from 99.99 to 30 mol%, particularly preferably from 99.98 to 95 mol%.

In a particular embodiment, the catalyst, before the hydrogenation, is treated with hydrogen ("activation") in acid solution, expediently in the mineral acid in which the hydrogenation is to be carried out.

The hydroxylammonium salts corresponding to the mineral acid employed are obtained, such as hydroxylammonium sulfate, hydroxylammonium nitrate or hydroxylammonium phosphate, preferably hydroxylammonium sulfate.

In a preferred embodiment, the hydroxylammonium salt prepared is hydroxylammonium sulfate in a cascade method, where from 2 to 10, preferably from 4 to 8, stirred reactors are generally connected to one another as a cascade, ie. in series. In general, from 4 to 12 $m^3/h$, preferably from 7 to 10 $m^3/h$, of 3 to 6N, preferably from 4 to 5N sulfuric acid together with from 0.5 to 6 $m^3/h$, preferably from 0.5 to 4.5 $m^3/h$, particularly preferably from 0.5 to 2 $m^3/h$, of hydroxylamine solution in a concentration in the range of from 50 to 150 g/l, preferably from 100 to 130 g/l, and with from 10 to 100 g/l, preferably from 20 to 50 g/l, of platinum/graphite catalyst containing 0.5 % by weight of platinum are fed to the first stirred reactor.

The stirred reactors are usually maintained at from 30° to 60° C., preferably at from 40° to 50° C., and at a pressure of from 1 to 5 bar, preferably from 1 to 3 bar (absolute).

The amount of material fed into the first stirred reactor plus the amount formed in the stirred reactors by reaction with the gaseous starting materials is expediently removed from the final reactor, essentially containing hydroxylammonium sulfate and suspended hydrogenation catalyst.

Nitrogen monoxide and hydrogen are preferably fed to each reactor, either separately or as a mixture. The total amount of nitrogen monoxide is usually in the range from 400 to 1200 $m^3/h$, preferably from 600 to 800 $m^3/h$, and the total amount of hydrogen is usually in the range from 800 to 3000 $m^3/h$, preferably from 1000 to 2000 $m^3/h$. In general, most nitrogen monoxide and hydrogen is fed to the first reactor, and least to the final reactor. Any reactors between the two are generally fed, in accordance with their sequence, with less nitrogen monoxide and hydrogen than the directly upstream reactor and more than the directly downstream reactor.

In the stirred reactor variant, the hydroxylammonium sulfate-containing mixture removed from the final reactor is usually collected in a hold tank. The reaction product generally contains hydroxylammonium sulfate in a concentration of from 50 to 140 g/l, preferably from 110 to 130 g/l (calculated as hydroxylamine), ammonium sulfate in a concentration in the range from 3 to 80 g/l, preferably from 15 to 25 g/l, sulfuric acid in a concentration in the range from 3 to 100 g/l, preferably from 10 to 20 g/l, and reaction offgases. The total amount of reaction offgas is usually in the range from 100 to 800 $m^3/h$, preferably from 200 to 700 $m^3/h$. The reaction offgas contains from 1 to 30% by volume, preferably from 3 to 20% by volume, of nitrogen monoxide, from 55 to 98% by volume, preferably from 58 to 85% by volume, of hydrogen and from 1 to 18% by volume, preferably from 2 to 16% by volume, of dinitrogen monoxide.

The reaction can also be carried out batchwise, in which case, under otherwise identical conditions, the reaction times are usually in the range from 4 to 8 hours.

After the reaction, the hydrogenation catalyst is separated off from the mixture in the hold tank by conventional filtration methods, for example by means of a cartridge filter. In a preferred embodiment, filtration is carried out by means of cartridge filters by generating, in a manner known per se, a pressure difference across the cartridges in the range from 200 to 20,000 mbar, preferably from 200 to 2000 mbar.

The composition of the filter residue and of the filtrate essentially depend on the filter employed. In general, the weight ratio between filter residue and filtrate is chosen to be in the range from 1:1.5 to 1:5, preferably from 1:2 to 1:4. The filter residue generally comprises from 6 to 16% by weight, preferably from 8 to 13% by weight, of the hydrogenation catalyst and from 84 to 94% by weight, preferably from 87 to 92% by weight, of a solution essentially comprising hydroxylammonium sulfate, which is generally present in a concentration of from 50 to 140 g/l, preferably from 110 to 130 g/l (calculated as hydroxylamine), ammonium sulfate, usually present in a concentration in the range from 3 to 80 g/l, preferably from 15 to 25 g/l, and sulfuric acid, generally present in a concentration in the range from 3 to 100 g/l, preferably from 10 to 20 g/l.

The filtrate is generally worked up in a conventional manner or predominantly employed for the preparation of cyclohexanone oxime, which in turn is used as a precursor for caprolactam.

Further work-up of the filter residue is carried out according to the invention by means of sedimentation. To this end, the filter residue, which is generally obtained as a suspension, is expediently allowed to settle in the filtration tank. The duration of the settling process naturally depends on the size of the tank chosen and on the sedimentation rate of the various particles. According to observations hitherto, settling times of from 0.5 to 10 minutes, preferably from 2 to 5 minutes, have proven successful. Shorter times usually show no differences from the procedures hitherto, and longer times generally provide no further significant advantages. Sedimentation can naturally also be carried out in another tank, in which case, however, transfer would be necessary.

The temperature during the sedimentation is generally selected to be in the range from 20° to 70° C., preferably from 30° to 50° C., and the pressure is usually atmospheric pressure, ie. in the range from 90 to 110 kPa.

After the sedimentation operation, from 30 to 85% by weight, preferably from 40 to 70% by weight, based on the total amount of filter residue, of the supernatant solution is generally separated off and, in a preferred embodiment, combined with the reaction product before filtration. The supernatant solution has a lower concentration of hydrogenation catalyst than before the sedimentation. The concentration of the hydrogenation catalyst in the supernatant solution is usually in the range from 0 to 5 g/l, preferably from 1 to 4 g/l.

The suspension remaining after removal of the supernatant solution has a higher concentration of hydrogenation catalyst than before the sedimentation. The concentration of the hydrogenation catalyst in the suspension which remains is usually in the range from 200 to 400 g/l, preferably from 220 to 350 g/l. The suspension remaining after the sedimentation is expediently re-employed for the preparation of hydroxylammonium salts. In a preferred embodiment, it is employed at the beginning of the reaction in the first stirred reactor in the continuous cascade procedure.

The process according to the invention has the advantage over the known processes mentioned above of a higher space-time yield. Furthermore, less dinitrogen monoxide is produced in the novel process than in the known processes, which increases the selectivity and reduces the consumption of nitrogen monoxide.

Examples

The gas analyses were carried out by means of IR spectroscopy. The compositions of the solutions and suspensions were determined titrimetrically and gravimetrically.

Example 8.9 m$^3$/h of 4.5N sulfuric acid, 360 kg/h of platinum catalyst, obtained from the product filtration (see below) (0.5% by weight of platinum on graphite; the preparation was carried out analogously to the procedure described in Example 1 of German Patent 1088037) and 920 kg/h of product solution from the filtration (composition: see filtrate) were fed at 40° C. and 1.5 bar (absolute) into the first reactor of a cascade of six stirred reactors, each with a volume of 20 m$^3$. Simultaneously, 10.5 m$^3$/h of reaction product containing 1250 kg of hydroxylammonium sulfate (calculated as hydroxylamine), 142 kg of ammonium sulfate and 160 kg of sulfuric acid (calculated as anhydrous sulfuric acid) in a concentration of 15 g of $H_2SO_4$ per liter, and 360 kg of platinum catalyst were discharged from the final reactor. Furthermore, a total of 920 m$^3$/h of nitrogen monoxide and 1570 m$^3$/h of hydrogen were fed at 40° C. and 1.5 bar (absolute) to the first to sixth reactors.

The reaction product from the final reactor was collected in a tank ready for the filtration. The product from this tank was filtered through two cartridge-filters (Schumacher) connected in parallel. The diameter of a cartridge filter was 1300 mm, the height was 1600 mm, and the capacity of an empty filter casing was 1860 l. A cartridge filter contained 169 porous (pore diameter: 60 μm) polyethylene filter cartridges (internal diameter of a cartridge: 40 mm, external diameter: 70 mm, length: 1100 mm). The pressure difference over the polyethylene filter cartridges was 1000 mbar. Per hour, the cartridge filters were charged twice with reaction product and back-flushed, both in a manner known per se. The temperature during the filtration was 40° C. One filtration (twice per hour) gave 2790 kg of filtrate and 1030 kg of a filter residue per filter. The filter residue comprised 9% by weight of the hydrogenation catalyst and 91% by weight of a solution essentially comprising hydroxylammonium sulfate, which was present in a concentration of 119 g/l (calculated as hydroxylamine), ammonium sulfate, which was present in a concentration of 14 g/l, and sulfuric acid, which was present in a concentration of 15 g/l.

The filter residue was left to settle in the filtration tank for 5 minutes. 600 l of the supernatant solution were then removed from each filter and combined with the reaction product in the pre-filtration tank. The composition of the supernatant solution corresponded to the composition of the filtrate, 600 l of solution also containing 10 kg of unsedimented catalyst. The suspension which remained (comprising 230 kg of solution and 90 kg of catalyst per cartridge filter) was fed back into the first reactor.

In addition, 400 m$^3$/h of offgas comprising 64% by volume of hydrogen, 11.8% by volume of nitrogen monoxide, 12.8% by volume of dinitrogen monoxide and 11.4% by volume of nitrogen, were obtained. Accordingly, 11.1% of the nitrogen monoxide employed were converted into dinitrogen monoxide.

Comparative Example

The following comparative experiment was carried out under substantially the same conditions as the example according to the invention. The rate of introduction of gas was set so that approximately the same amounts of offgas were obtained as in the example according to the invention. In detail:

7.8 m³/h of 4.5N sulfuric acid and 360 kg/h of platinum catalyst (0.5% by weight of platinum on graphite, same catalyst as in the above example) were fed at 40° C. and 1.5 bar (absolute) into the first reactor of a cascade comprising six stirred reactors, each with a capacity of 20 m³. 3740 kg/h of product solution from the filtration were fed into the first reactor together with the catalyst (composition: see filtrate). Simultaneously, 11.7 m³/h of reaction product containing 1340 kg of hydroxylammonium sulfate (calculated as hydroxylamine), 160 kg of ammonium sulfate and 170 kg of sulfuric acid (calculated as anhydrous sulfuric acid) in a concentration of 15 g of $H_2SO_4$ per liter, and 360 kg of platinum catalyst were removed from the final reactor. In addition, a total of 790 m³/h of nitrogen monoxide and 1360 m³/h of hydrogen were fed at 40° C. and 1.5 bar (absolute) to the first to sixth reactors.

As in the example according to the invention, 2 filtration cycles were carried out per hour and 2 cartridge filters, identical to those described above, were employed connected in parallel. The pressure difference was likewise 1000 mbar, and the temperature was 40° C. 2440 kg of filtrate and 1030 kg of a filter residue were obtained per filtration cycle and per cartridge filter. The filter residue comprised 9% by weight of the hydrogenation catalyst and 91% by weight of a solution essentially comprising hydroxylammonium sulfate, which was present in a concentration of 116 g/l (calculated as hydroxylamine), ammonium sulfate, which was present in a concentration of 14 g/l, and sulfuric acid, which was present in a concentration of 15 g/l.

The suspension containing the filter residue (a total of 3350 l/h for the two filters together) was, in contrast to the above example, not allowed to settle, but was immediately fed back into the first reactor.

In addition, 400 m³/h of offgas comprising 67% by volume of hydrogen, 8.5% by volume of nitrogen monoxide, 13.0% by volume of dinitrogen monoxide and 11.5% by volume of nitrogen, were produced. Accordingly, 13.2% of the nitrogen monoxide employed were converted into dinitrogen monoxide.

The two examples confirm that the sedimentation of the filter residue causes an increase in the space-time yield of 1.6 kg of hydroxylamine per m³ of reaction space and per hour to a value of 9.6 kg of hydroxylamine per m³ of reaction space and per hour.

Furthermore, the examples confirm a reduction in the amount of nitrogen monoxide employed (according to the invention: 80.0 m³ of nitrogen monoxide per kg of hydroxylamine and per hour; comparison: 82.4 m³ of nitrogen monoxide per kg of hydroxylamine and per hour) and a reduction in the amount of dinitrogen monoxide formed.

We claim:

1. In the process for the preparation of hydroxylammonium salts by catalytic reduction of nitrogen monoxide using hydrogen in the presence of a hydrogenation catalyst, the improvement therein which comprises:

(a) in a first step, filtering the reaction mixture obtained after the catalytic reaction of nitrogen monoxide using hydrogen in the presence of a hydrogenation catalyst reaction giving a solution of essentially hydroxylammonium salt and a filter residue of essentially a mixture of hydrogenation catalyst and a solution of essentially hydroxylammonium salt, and (b) in a second step, subjecting the filter residue to sedimentation in order to concentrate the hydrogenation catalyst, giving a mixture having a higher concentration of hydrogenation catalyst than the filter residue and a mixture having a lower concentration of hydrogenation catalyst than the filter residue, followed by (c) combining the mixture from step (b) which has a lower concentration of hydrogenation catalyst than the filter residue with the reaction mixture obtained after the catalytic reduction reaction but before the filtration thereof in step (a), and (d) employing the mixture from step (b) which has a higher content of hydrogenation catalyst than the filter residue in the preparation of hydroxylammonium salts by the catalytic reduction of nitrogen monoxide using hydrogen in the presence of a hydrogenation catalyst.

2. A process as claimed in claim 1, wherein the mixture from step (b) having a lower content of hydrogenation catalyst is essentially hydroxylammonium salt.

3. A process as claimed in claim 1, wherein the mixture from step (b) which has a higher content of hydrogenation catalyst than the filter residue is employed at the beginning of the catalytic reduction reaction recited in step (a).

4. A process as claimed in claim 1, wherein the hydroxylammonium salt is hydroxylammonium sulfate.

* * * * *